UNITED STATES PATENT OFFICE.

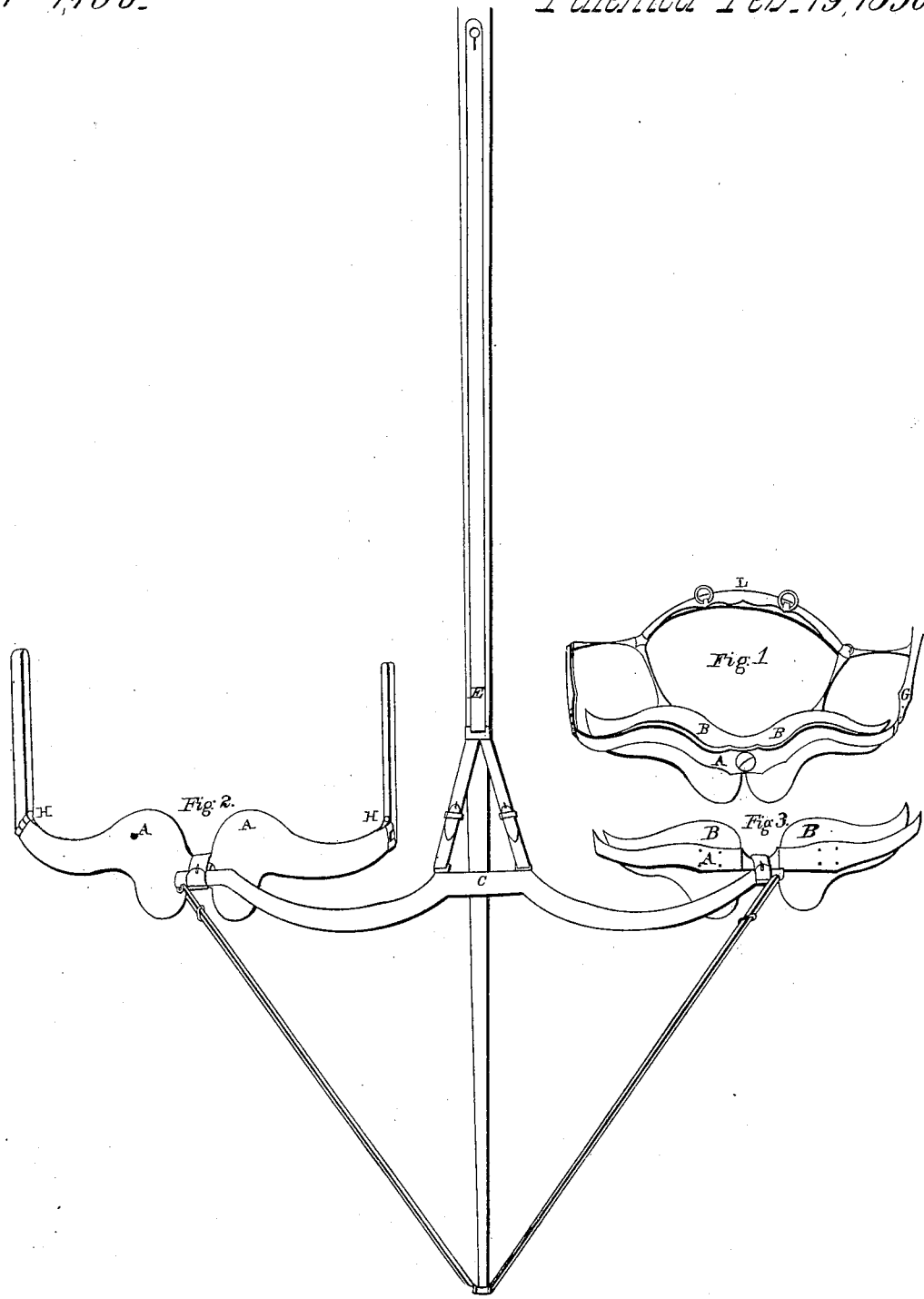

ORRIN RAMSDELL, OF WESTFIELD, VERMONT, ASSIGNOR TO JOSEPH B. SAWYER AND SYLVANUS SAWYER, OF MOUSEN, MASSACHUSETTS.

BREAST-PLATE FOR HARNESS.

Specification of Letters Patent No. 7,106, dated February 19, 1850.

*To all whom it may concern:*

Be it known that I, ORRIN RAMSDELL, of Westfield, in the county of Orleans and State of Vermont, have invented a new and useful Improvement in the Construction of the Breast-Plate for the Horse-Harness; and I hereby declare the following to be a full and exact description of the construction and operation of the same, reference being had to the accompanying drawings, as forming part of this specification.

Figure 1, single harness. A is a bar or beam passing horizontally across the breast of the horse; B is a steel spring to which the pads are attached fixed to the bar by a square bolt, S with a nut on the inside. The spring B on either side of the bolt S is suitably padded for the ease and comfort of the horse, the whole suspended by the neck strap L which takes hold of the spring at the highest point of the curve and also the side strap G, the whole to be attached to the common harness, the same as now in use.

I also construct the breast plate by enlarging the spring and dispensing with the bar A, as seen in Fig. 2 for a double harness. The spring B padded as in Fig. 1: and instead of the beam A as shown in drawings Fig. 1, attached directly to the yoke C at the place of bolt S is a projection or curve with a projecting lower edge to sustain the yoke this breast plate has a thin strip of iron running from the joint H of which it forms a part to the back pad and girt of the harness to prevent the plate from rolling on the horse's breast, the neck strap is attached as shown in drawings Fig. 1.

I also construct the breast plates by substituting the bar A for the spring as shown in drawing Fig. 3 in which case the pads are formed on two separate concave plates B, B, and attached to the bar or spring by a double fulcrum joint allowing the pads to rock and adjust itself to the shape and motion of the horse: the concave plates B, B, should be suitably padded for the ease and comfort of the horse, the above attached to the yoke as shown in the drawings Figs. 2 and 3, and suspended from the neck in the same manner as shown in Fig. 1.

It will be seen by the arrangement that in a double harness the traces, whiffletree and eveners of common use are dispensed with and in place thereof is substituted the center draft E and the yoke C as seen in the drawings retaining the pole guide S, S, of common use.

The advantages of this construction of double harness over others is first in the expansive action on the breast of the horse relieving the side pressure and allowing the horse full and free respiration and circulation of the blood; and also in dispensing with the traces, whiffletrees and eveners which in plowing are very objectionable and also makes a light and easy harness for traveling. One other advantage is that the plate can be raised on the breast of the horse three or four inches higher than any other breast plate now in use. The single breast plate as shown in drawings Fig. 1 can be raised on the horse's breast by use of the self adjusting pad to any suitable height.

What I claim as my invention and desire to secure by Letters Patent, is—

The center draft and expansion breast plate for the horse harness in combination with the use of the double fulcrum self adjusting pad applied either to the double or single harness as set forth.

ORRIN RAMSDELL.

Witnesses:
 C. C. CURTIS,
 WM. DECKER.